ROLLAND W. COLLAR,
INVENTOR.

WHANN & McMANIGAL
Attorneys for Applicant

United States Patent Office 3,191,972
Patented June 29, 1965

3,191,972
QUICK CONNECT TUBE COUPLING HAVING LOCKING MEANS WITH VISUAL INDICATOR
Rolland W. Collar, Sun Valley, Calif., assignor, by mesne assignments, to Lear Siegler, Inc., a corporation of Delaware
Filed May 9, 1960, Ser. No. 27,679
2 Claims. (Cl. 285—93)

This is a continuation-in-part of application Serial No. 756,878, filed Aug. 25, 1958 and now Patent No. 3,083,-042. The present invention relates generally to couplings for fluid lines, and the like; and is more particularly concerned with couplings for this purpose which may be quickly connected and disconnected.

Conventional quick action couplings have in the main heretofore been constructed with locking elements which have taken the form of spheres or balls. The argument for the use of balls primarily was that it permitted ease of operation. However, the use of balls introduced other problems which were undesirable and prevented the use of such couplings on relatively high fluid pressures. Since the balls operated against adjacent surfaces with point contacts, the use of such balls in couplings for high pressure lines have the inherent disadvantage of producing "Brinelling" effects due to the concentration of pressures at point contacts. The surfaces with which the ball engaged therefore became pitted, and the couplings became unreliable in use.

In the present invention, it is an object to provide locking elements in the form of pins, and provide surface contacts of engagement rather than point or line contacts of engagement. Although at first blush this may appear to be a simple expedient, it has been found that more reliable couplings are obtained, the couplings may be operated with higher pressures, and the useful life of the coupling is prolonged. By way of comparison, tests have indicated that conventional couplings utilizing ball type locking members show a proof pressure of 1800 p.s.i., and a burst pressure of 6800 p.s.i. In the coupling of the present invention for aircraft use, the proof pressure is of the order of 6000 p.s.i., and the burst pressure 12,000 p.s.i.

A further object of the present invention is to provide improved means for latching the coupling in locked position, such means being visibly indicated from the exterior of the coupling. In the conventional quick connect couplings utilizing ball locking elements, the actuating cams have been provided with dwell or detent notches for receiving the balls in the locked position of the coupling, whereby the balls are releasably latched. This arrangement is undesirable in that the sealing member, usually an O-ring between the female and male parts of the coupling, is initially over-compressed and then released when the ball enters the detent notch. In the arrangement of the present invention, wedging surfaces of engagement of the locking members with abutment shoulders of an associated groove act to compress the sealing ring and hold the compressing pressure thereagainst when the locking pins are in locked position.

A further object of the present invention is to provide the coupling members with poppet type valves which will close when the coupling members are disconnected, but which will be moved to open position, when the members are connected, the valves in open position being so arranged as to permit substantially full flow with substantially no turbulence.

A still further object is to provide unique means for indicating whether the coupling members are in locked or unlocked condition, and in which there is not only a visual indication but means whereby a person may determine the locked and unlocked condition through a sense of touch or feel.

Further objects of the invention will be brought out in the following part of the specification, wherein detailed description is for the purpose of fully disclosing the invention without placing limitations thereon.

Referring to the accompanying drawings, which are for illustrative purposes only:

Referring now more specifically to the drawings, for illustrative purposes, the coupling of the present invention is shown as comprising a pair of telescoping members A and B which are arranged to be connected and disconnected in end-to-end relation. The telescoping members are illustrated in the disclosed embodiment as respectively comprising a telescoping member A which forms a male member, and the telescoping member B which forms a female member. The outermost ends of the coupling members may be fabricated with any of the conventional type of arrangements for pipe or conduit connections. In the present instance the ends are merely internally threaded as shown at 10. The external end portions may, if desired, be constructed to form a faceted flange 11 for the reception of a wrench or like tool.

Figure 1:
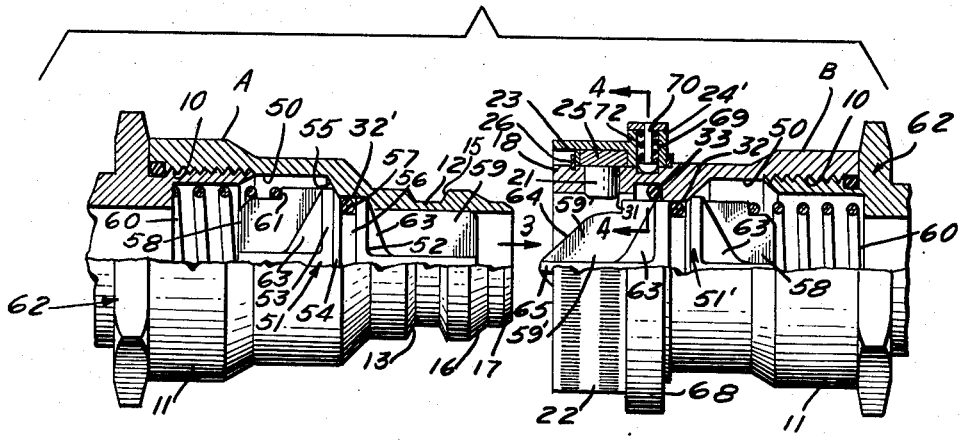
FIG. 1 is a side view of a coupling embodying the features of the present invention in which coupling elements having valving members and means for indicating their locked and unlocked condition are shown in disconnected relation.

The male member A, at its other end has an end portion 12 of reduced outside diameter, as shown in FIG. 1, and is constructed with a circumferentially extending groove 13 having sloped side walls which provide bevelled circumferentially extendnig shoulders 14 and 15. Axially spaced from the groove 13 towards the outer end of the portion 12, there is further provided a circumferentially extending bevelled shoulder 16 which connects with a tip end portion 17 having a further reduced outer diameter.

Figure 2:
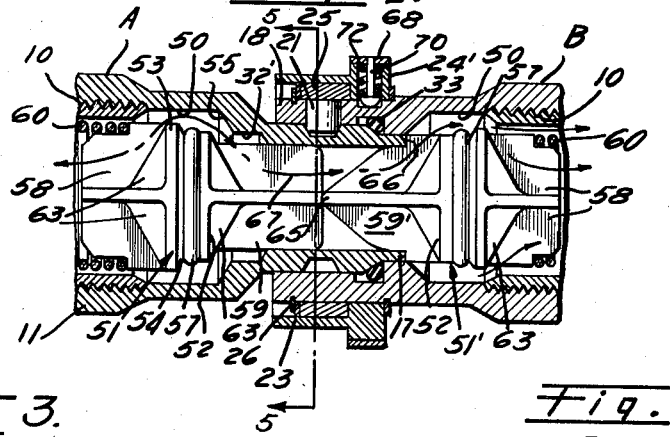
FIG. 2 is a fragmentary view partly in section, and showing the coaction of the valving members when the coupling elements are in connected relation.
Figure 3:
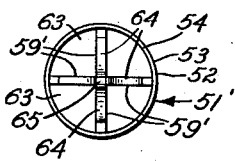
FIG. 3 is an end view of one of the valve elements as it appears when viewed in a direction as indicated by the arrow 3 in FIG. 1.

The female member B has an end portion 18 of reduced outside diameter which results in the formation of an abutment shoulder 19 therearound. The portion 18, as shown in FIGS. 1 and 2 is provided with a plurality of radially extending openings 20 within which there are reciprocably mounted locking members in the form of pins 21.

The pins 21 are retained by a cam ring structure 22. This structure comprises a spaced sleeve portion 23 which is provided with an inwardly projecting end flange 24 at one end. This end flange is in sliding engagement with the outer surface of the end portion 18, and also abuts the shoulder 19. Housed within the sleeve portion 23 is a cam insert 25 which may be integrally formed with the ring, if desired, but in this case is shown as a separate element. The cam insert is retained in a seated position by means of a snap ring or a spring ring 26 which fits into an associated groove in the adjacent face of the end portion 18. The retaining ring 26 and shoulder 19 thus hold the cam ring 22 and its insert 25 against axial movements, but permit free rotative movements thereof as a unit.

The cam insert has its innermost edge provided with a circular series of cam pockets each encompassing one of the pins 21 and having a cam surface which is adapted in one position of the cam ring to force the associated pin inwardly to a locked position with its innermost end positioned in the groove 13, and in another position of the cam ring release the pin for movement outwardly to withdraw the inner end of the pin from the groove 13.

The pins 21 may have a desired cross-section of any configuration. That is, the pins may be made multifaced, or may be of generally circular cross section. In any event, it is desirable to prevent the pin from rotating in its retaining opening.

Referring to FIG. 2, it will be observed that when the male member A and female member B are moved into telescoped relation, the tip end portion 17 of the male member guidingly enters an internal opening 32 of the female member, and at this point the bevelled shoulder 16 is brought into engagement with an O-ring sealing gasket 33. During this operation, the cam ring 22 will of course be in a position wherein the cam pocket will be of its greatest depth so as to permit the pins 21 to move outwardly sufficiently to permit the male and female members to be telescoped, as explained above. If the connection operation is now continued by manually rotating the cam ring 22, the cam surfaces will act to force the pins radially inwardly. As the pins move inwardly, the surface 31' of the pin coacts in each case with the bevelled shoulder 15 of the groove 13 to further force the male and female members into finally seated and sealed position, wherein the bevelled shoulder 16 acts to compress the gasket 33 as shown in FIG. 2 to form a pressure seal between the male and female members.

The male and female members as generally indicated at A and B incorporate poppet type valves which will close when the coupling members are disconnected, but will be moved to open position when the coupling members are connected. The coupling members have in each case been constructed with an enlarged internal diameter bore portion 50. In the case of the female member B, this enlarged bore lies between the internal opening or passage 32 and the adjacent flange 11, while in the case of the male member A, the enlarged bore portion is positioned between a similar internal opening or passage 32' and the adjacent flange 11.

The coupling members A and B are respectively provided with internal valve structures, as generally indicated by numerals 51 and 51', and which are basically of similar construction. Each of the valve structures comprises an interend body portion 52 provided with a peripheral flange 53 having a beveled annular seating surface 54 which is adapted to make seating engagement with a beveled shoulder 55 formed on the adjacent inner wall of the connector member.

Adjacent the flange 53, the body portion is provided with an outer circumferentially extending groove 56 in which there is positioned an O-ring 57 of a diameter such that it will make sealing engagement with the wall of the internal opening or passage 32' when the valve is in seated closed position, as shown in FIG. 1.

Fluid flow guiding radial fins 58 and 59 are respectively provided on opposite sides of the valve body portion 52. The fins 59 have their outer edges in sliding engagement with the adjacent internal wall of the end portion 12 and serve to stabilize and guide the axial movement of the valve 51 towards and away from its seating position. The fins 58 have their outer edges arranged to receive one end of a compression coiled spring 60 thereover into abutment with shoulders 61 respectively formed in the outer edges of the fins. The other end of the coiled spring 60 is arranged to bear against a connection fitting as generally indicated at 62, and having threaded connection with this end of the coupling member.

At the juncture of the fins with the body portion, inclined surfaces 63 are provided for changing axial flow of a fluid between the fins in a direction towards the body portion 52 into a generally radially extending direction.

It will be observed that the valve structure 51' in the female connector member B is supported for reciprocable movement in a slightly different manner than the valve structure 51. In this case, the outer edges of the fins 59' are in sliding engagement with the wall surface of the internal opening or passage 32. Moreover, since the fins 59' are arranged to enter the tip end portion 17, when the coupling members are interconnected into telescoping end-to-end relation, connection of the coupling members will be facilitated by providing curved edges 64 on the fins 59', which converge to a substantial point 65.

Referring now to FIG. 2, the coupling members are illustrated as being in telescoping interconnected end-to-end relation, and with the valve structures 51 and 51' in open position. It will be readily apparent that when the coupling members are moved into connected relation, the point 65 of the fins 59' will engage the adjacent confronting fins 59 of the valve structure 51 along the valve axis, and as the coupling members are moved to fully coupled position, the tip end portion 17 will engage shoulders 66 formed on the fins 59' and force the valve structure 51' to its open position. The valve 51' by virtue of the engagement of point 65 will in turn actuate the valve 51 to its open position.

The valve structures are shown in open position in FIG. 2, and in such positions it will be observed that the body portions 52—52 of the respective valves are positioned in the enlarged bore portion 50 of the associated coupling member. As thus positioned, the valve fins and the inclined surfaces 63 of the valve structures operate to guide fluid flow through a substantially full flow channel in a path as indicated by the flow line 67 in such a manner that there will be no abrupt changes in the direction of flow, and the flow will be accomplished with little or no turbulence.

It is believed clearly apparent that when the coupling members are disconnected, the valves will be automatically motivated to closed seated position. In the seated position, the O-rings 57 further act to seal the closed valve against leakage and augment the seal which is obtained between the seating surfaces 54 and 55.

Figure 4:
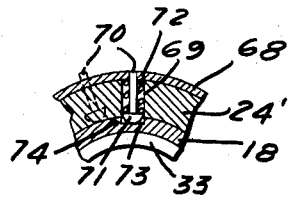
FIG. 4 is a fragmentary sectional view taken substantially on line 4—4 of FIG. 1, and showing details of means for indicating locked and unlocked conditions of the coupling.
Figure 5:
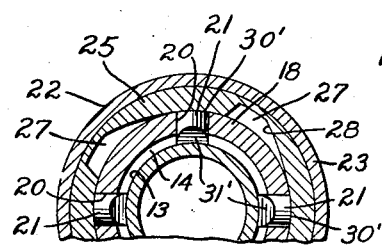
FIG. 5 is a partial transverse cross-sectional view taken substantially on line 5—5 of FIG. 2.

Referring further to FIGS. 1 and 4 the invention as illustrated incorporates means which will visually and by sense of feel indicate the locked and unlocked condition of the coupling members. As shown in FIG. 1 outwardly projecting end flange 24' is surrounded by a peripheral ring 68. The end flange 24' is provided with a radially extending passage 69 within which there is positioned a pin 70, this pin being reciprocably movable and having its outer end extending through an opening in the peripheral ring 68. The innermost end of the pin has a head portion 71, and a spring 72 normally acts to bias the pin inwardly. This pin is so positioned circumferentially of the end flange 24' that in the locked position of the coupling members, the head 71 will enter a recessed portion 73 formed in the adjacent wall of the end portion 18 of the coupling member. When the cam ring 22 is moved to a position for unlocking the coupling members with respect to each other, the pin 70 will be moved from its full line position as shown in FIG. 4. During this movement, the head 71 of the pin will immediately ride up over a cam surface 74 which will cause the outer end of the pin to visibly project beyond the outer surface of the peripheral ring 68, as shown in dotted lines. In this position, the pin end may be easily sensed by feel so that it is possible to determine whether the coupling parts are in locked or unlocked position, even in an unlighted or dark area.

Various modifications may suggest themselves to those skilled in the art without departing from the spirit of my invention, and, hence, I do not wish to be restricted to the specific form shown or uses mentioned, except to the extent indicated in the appended claims.

I claim:

1. In a coupling: a pair of telescoping members connectable in end-to-end relation; cam actuated means for locking said members in said connected relation, including an external rotatably mounted actuator ring carried by one of said members, said ring being rotatable to locking and nonlocking positions, a pin carried by said ring and mounted thereon for axial movements radially of said ring to an extended position with one end projecting beyond an adjacent outer surface of the ring, and to a retracted position with said one end flush with said adjacent outer ring surface, and first and second pin moving means for axially moving said pin to said extended and retracted positions respectively in response to rotational movements of said actuator ring to said nonlocking and locking positions.

2. In a coupling: a pair of telescoping members connectable in end-to-end relation; cam actuated means for locking said members in said connected relation, including an external rotatably mounted actuator ring carried by one of said members, said ring being rotatable to locking and nonlocking positions, a pin carried by said ring and mounted thereon for axial movements radially of said ring to an extended position with one end projecting beyond an adjacent outer surface of the ring, and to a retracted position with said one end flush with said adjacent outer ring surface, a spring normally biasing the pin to said retracted position with the other end being received in a recessed portion on said one of said members in the locking position of said ring, and cam means in said recessed portion for moving said pin to said extended position against the action of said spring in response to movement of said ring to said nonlocking position.

References Cited by the Examiner
UNITED STATES PATENTS

| | | | |
|---|---|---|---|
| 2,428,077 | 9/47 | Herold | 285—89 |
| 2,550,421 | 4/51 | Mueller | 285—89 |
| 2,837,352 | 6/58 | Wurzburger | 285—93 |
| 2,850,297 | 9/58 | Clark | 284—18 |
| 2,919,935 | 1/60 | Nyberg | 284—18 |

FOREIGN PATENTS 49,276  4/40  Netherlands.

OTHER REFERENCES

Panaro: Clicking Connector, December, 1958, vol. 1, No. 4, p. 15 IBM Technical Disclosure Bulletin.

CARL W. TOMLIN, *Primary Examiner.*

MORRIS M. FRITZ, THOMAS F. CALLAGHAN,
*Examiners.*